United States Patent
Hess

(10) Patent No.: US 9,376,631 B2
(45) Date of Patent: Jun. 28, 2016

(54) OIL FORMING COMPOSITION, METHOD OF PRODUCING CRUDE OIL, AND METHOD OF PRODUCING VOLATILE LIQUID

(71) Applicant: James H. Hess, Harrisburg, PA (US)

(72) Inventor: James H. Hess, Harrisburg, PA (US)

( * ) Notice: Subject to any disclaimer, the term of this patent is extended or adjusted under 35 U.S.C. 154(b) by 258 days.

(21) Appl. No.: 14/283,388

(22) Filed: May 21, 2014

(65) Prior Publication Data

US 2015/0337209 A1 Nov. 26, 2015

(51) Int. Cl.
*C10G 1/04* (2006.01)
*C10L 1/02* (2006.01)
*C10L 1/04* (2006.01)
*C10G 3/00* (2006.01)

(52) U.S. Cl.
CPC *C10G 1/045* (2013.01); *C10G 3/40* (2013.01); *C10L 1/02* (2013.01); *C10L 1/04* (2013.01); *Y02P 30/20* (2015.11)

(58) Field of Classification Search
CPC ............ C10G 1/045; C10G 3/40; C10L 1/02; C10L 1/04; Y02P 30/20
See application file for complete search history.

(56) References Cited

U.S. PATENT DOCUMENTS

| | | | | |
|---|---|---|---|---|
| 1,941,169 A | * | 12/1933 | Gruse et al. | C10G 9/06 208/81 |
| 4,102,938 A | * | 7/1978 | Rao | C07C 1/00 585/640 |

* cited by examiner

*Primary Examiner* — Cephia D Toomer
(74) *Attorney, Agent, or Firm* — Spilman Thomas & Battle PLLC; William P. Smith

(57) ABSTRACT

An oil forming composition and a method of producing a synthetic crude oil are provided. The oil forming composition includes a mixture of an organic material selected from the group consisting of a member of the *lactuca* genus, nuts, nut derivatives, vegetable oils, pine tree derivatives, animal protoplasm, and combinations thereof; and a mineral aggregate selected from the group consisting of a silica containing mineral aggregate and a quartz containing mineral aggregate. The method of producing synthetic crude oil includes positioning a first heating enclosure adjacent to a heating surface, providing an oil forming composition within the first heating enclosure, positioning a lid over the oil forming composition, simultaneously applying pressure to the lid and heating the oil forming composition, cooling the oil forming composition to form a pre-volatile oil product, and heating the pre-volatile oil product while exposed to air to form the synthetic volatile fuel.

11 Claims, 4 Drawing Sheets

OIL FORMING COMPOSITION, METHOD OF PRODUCING CRUDE OIL, AND METHOD OF PRODUCING VOLATILE LIQUID

FIELD OF THE INVENTION

The present invention is directed toward an oil forming composition, a method of producing crude oil, and a method of producing volatile liquid. More specifically, the present invention is directed to a method of producing a synthetic crude oil from an oil forming composition, a method of producing a volatile liquid from the synthetic crude oil.

BACKGROUND OF THE INVENTION

Crude oil is a naturally occurring petroleum product composed of hydrocarbon deposits. When refined, crude oil can produce various fuels such as gasoline, diesel, and other forms of petrochemicals. Additionally, refined crude oil is used in a large number of consumer products, including asphalt, pharmaceutical, and plastics.

Current crude oil deposits are finite in number and often located in geological formations beneath the Earth's surface. Recovery of crude oil from the deposits is commonly accomplished through drilling, which both dangerous and damaging to the environment. Furthermore, the continuous use of crude oil is depleting the Earth's existing oil reserves.

Due to limited availability and increased demand, crude oil prices have persistently risen, and will most likely continue to do so. As there is no widely accepted alternative currently available, the increasing prices and finite quantity generate substantial concern over future availability.

An oil forming composition and a method of producing synthetic crude oil that do not suffer from one or more of the above drawbacks would be desirable in the art.

BRIEF DESCRIPTION OF THE INVENTION

In one exemplary embodiment, an oil forming composition includes a mixture of an organic material selected from the group consisting of a member of the *lactuca* genus, nuts, nut derivatives, vegetable oils, pine tree derivatives, animal protoplasm, and combinations thereof; and a mineral aggregate selected from the group consisting of a silica containing mineral aggregate and a quartz containing mineral aggregate.

In another exemplary embodiment, a method of producing a synthetic crude oil includes providing a heating unit, positioning a first heating enclosure adjacent to a heating surface of the heating unit, providing an oil forming composition within the first heating enclosure, positioning a lid over the oil forming composition within the first heating enclosure, simultaneously applying pressure to the lid and heating the oil forming composition within the first heating enclosure, cooling the oil forming composition to form a pre-volatile oil product, and heating the pre-volatile oil product while exposed to air to form the synthetic crude oil. Applying pressure to the lid compresses the oil forming composition within the first heating enclosure.

In another exemplary embodiment, a method of producing a volatile liquid including forming a synthetic crude oil, providing a distilling unit, providing a portion of the synthetic crude oil in a heating flask, heating the synthetic crude oil in the heating flask to form a vapor, and condensing the vapor to form the volatile liquid.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are an oil forming composition, a method of producing a synthetic crude oil, and a method of producing a volatile liquid. Embodiments of the present disclosure, in comparison to methods not using one or more of the features disclosed herein, provide synthetic crude oil, decrease dependence upon existing oil reserves, provide crude oil without drilling, convert carbohydrates to hydrocarbons without the use of sulfur, or a combination thereof.

Figure 1:
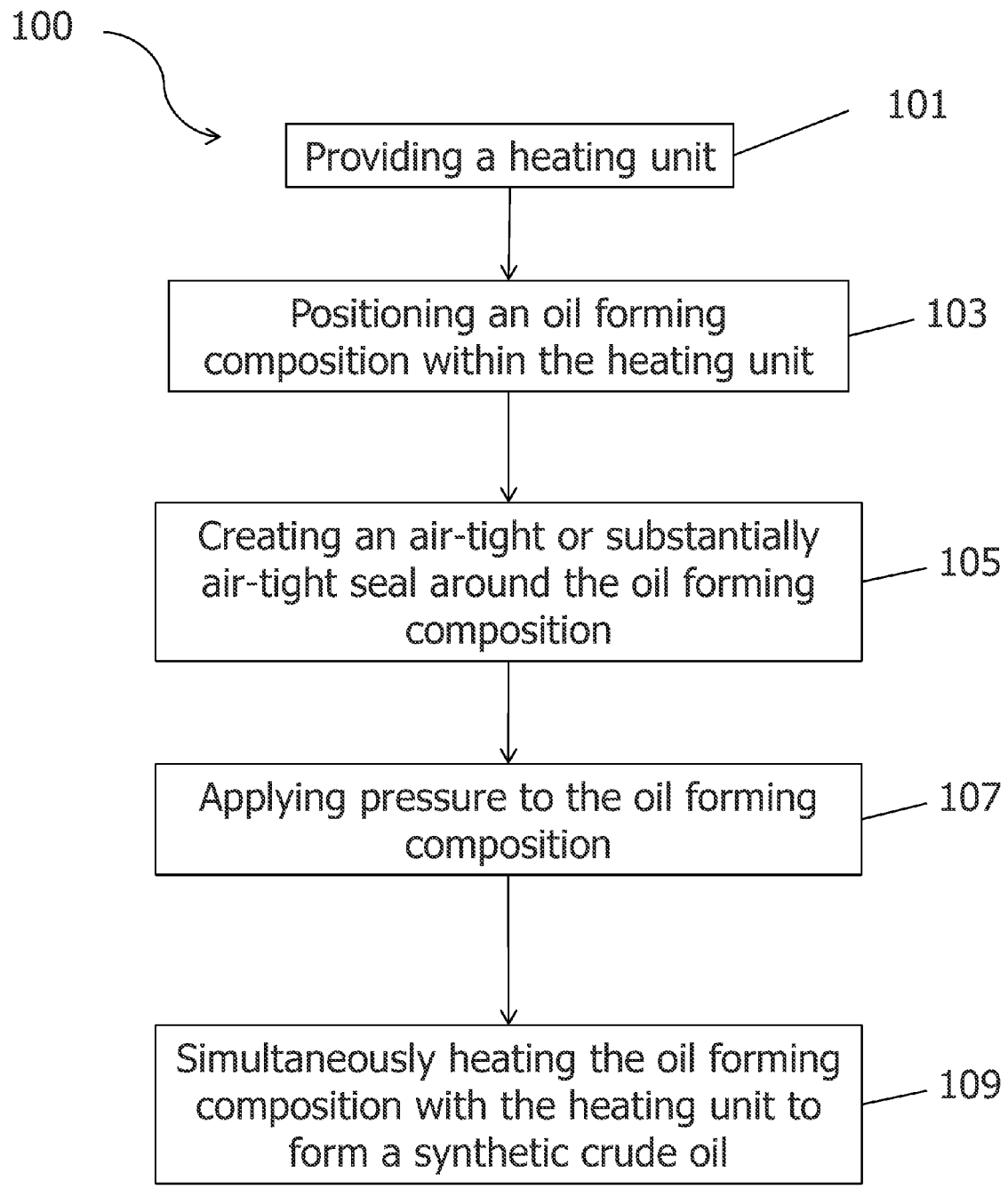
FIG. 1 is a flow chart of a method of producing crude oil, according to an embodiment of the disclosure.
Figure 2:
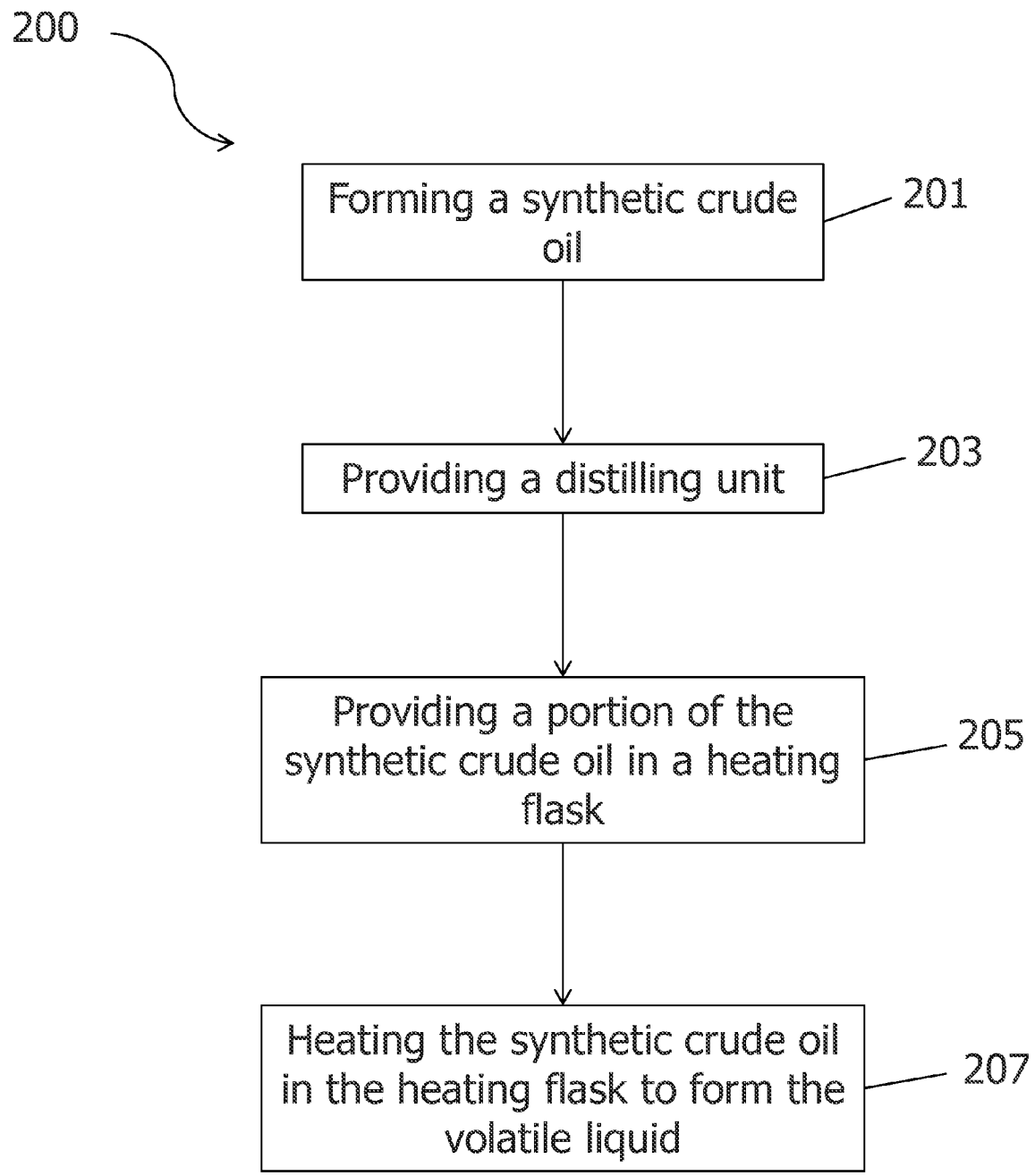
FIG. 2 is a flow chart of a method of producing a volatile liquid, according to an embodiment of the disclosure.

Referring to FIG. 1, in one embodiment, a method 100 of producing crude oil includes providing a heating unit (step 101), positioning an oil forming composition within the heating unit (step 103), creating an air-tight or substantially air-tight seal around the oil forming composition (step 105), applying pressure to the oil forming composition (step 107), and simultaneously heating the oil forming composition with the heating unit to form a synthetic crude oil (step 109). The heating unit includes any apparatus for providing increased temperatures of at least 1000° F., such as, but not limited to, a hot plate. For example, one heating unit includes a 12 inch wide by 12 inch long by 5.5 inch deep hot plate having 1 inch feet and a heating capacity of at least 1300° F.

In another embodiment, the heating unit includes a heating surface in thermal communication with a heating chamber. The heating chamber is adjacent to and/or partially surrounds the heating surface, and includes any device for generating heat. In one embodiment, the heating chamber is at least partially covered by soil, sand, rock, or other material during the production of crude oil. In another embodiment, the heating chamber includes a coupling for securing an air intake member thereto. The air intake member includes a pipe, a tube, a hose, any other gas supplying member, or a combination thereof. For example, one air intake member includes a 0.75 inch diameter pipe having a length of 3 feet. The air intake member provides air to the heating chamber to permit operation of the heating chamber when covered.

The heating surface includes any surface for conducting heat generated by the heating chamber, such as, but not limited to, a metal plate without openings extending therethrough. In one embodiment, the heating surface is a single flat metal plate positioned on top of, or integral with, the heating unit. In another embodiment, the heating surface includes any width and/or length equal to or less than the width and/or the length of the heating unit. For example, one heating surface includes a 6.5 inch wide by 7 inch long by 0.25 inch deep steel plate that is integral with, and forms a portion of, the top of the heating unit.

At least one heating enclosure is positioned on or adjacent to the heating surface. In one embodiment, the at least one heating enclosure includes a first heating enclosure for receiving the oil forming composition therein. The first heating enclosure includes any shape and size for being positioned on the heating surface. For example, in one embodiment, the first heating enclosure is a 6.25 inch wide by 6.5 inch long rectangular box having a depth of 7 inches extending between an open face and a closed face to provide a total volume of about 280 cubic inches (about 1.21 gallons). In another embodiment, the first heating enclosure is formed from metal plates, such as steel, having a thickness of up to 1 inch, between 0.25 inches and 1 inch, between 0.25 inches and 0.75 inches, 0.5 inches, or any combination, sub-combination, range, or sub-range thereof. Other perimeter shapes of the first heating enclosure include square, rectangular, triangular, circular, oval, polygonal, or any other geometrical shape that is the same as or different from a shape of the heating surface. Other sizes of the first heating enclosure include any length, width, and/or curvature equal to or less than the length and width of the heating surface. As will be appreciated by one skilled in the art, the size of the first heating enclosure may be increased or decreased with increases or decreases in the width and/or length of the heating surface.

A lid is provided to form a seal with an interior surface of the first heating enclosure. The lid includes a shape corresponding to the shape of the first heating enclosure. For example, in one embodiment, the lid is 6 inches wide by 6.25 inches long to form the seal with a 6.25 inch wide by 6.5 inch long by 7 inch deep rectangular box formed from 0.25 inch thick metal plates. In another embodiment, a gasket material is positioned around a perimeter of the lid. The lid includes a thickness of, for example, up to 1 inch, between 0.25 inches and 1 inch, between 0.25 inches and 0.75 inches, 0.5 inches, or any combination, sub-combination, range, or sub-range thereof. The thickness of the lid is either similar to or different from the thickness of the metal plates forming the first enclosure.

In an alternate embodiment, the at least one heating enclosure includes the first heating enclosure and a second heating enclosure. The second heating enclosure includes any shape and size for being positioned, and conveying heat, between the heating surface and the first heating enclosure. For example, in one embodiment, the second heating enclosure includes a 6 inch square box having a depth of at least 3.5 inches extending between an open face and a closed face. Other sizes of the second heating enclosure include any length and width that are less than that of the first heating enclosure. The depth of the second enclosure includes any depth to provide clearance for attaching securing members to the first heating enclosure.

The oil forming composition includes a mixture of organic materials and silica and/or quartz containing mineral aggregates. Without wishing to be bound by theory, the silica is believed to act as a catalyst for the production of the crude oil by providing a heat holding agent. The organic materials include, but are not limited to, a member of the *lactuca* genus (e.g., lettuce), nuts and/or nut derivatives, vegetable oils, pine tree derivatives, animal protoplasm, or combinations thereof. In one embodiment, the oil forming composition includes the vegetable oils, the lettuce, and the silica containing mineral aggregates. For example, one oil forming composition includes a mixture of, by volume, between about 25% and about 40% sand, between about 20% and about 40% corn oil, between about 20% and about 40% peanut oil, and between about 5% and about 15% romaine lettuce. Another oil forming composition includes a mixture of, by volume, about 33% sand, about 29% corn oil, about 29% peanut oil, and about 9% romaine lettuce. The sand in the oil forming composition produces an increased amount of the volatile fuel as compared to shale.

In another embodiment, the oil forming composition includes the animal protoplasm, the pine tree derivatives, and the quartz containing mineral aggregates. For example, another oil forming composition includes a mixture of ground beef, gum turpentine, and riverbed stones and/or shale. In a further embodiment, the oil forming composition includes the animal protoplasm, the vegetable oils, the lettuce, and the quartz containing mineral aggregates. For example, another oil forming composition includes a mixture of 50 fluid ounces of corn oil, 0.5 pounds of ground beef (20% fat), 1 head of chopped romaine lettuce, and about 130 cubic inches of shale.

In one embodiment, to produce the crude oil, the heating unit is positioned in a heating area, then the first heating enclosure is positioned on the heating surface of the heating unit and filled with the oil forming composition. The lid is positioned over the oil forming composition within the first heating enclosure and pressure is applied to the lid to compress the oil forming composition. The pressure applied to the lid includes at least 125 pounds, at least 135 pounds, at least 150 pounds, at least 200 pounds, or any combination, sub-combination, range, or sub-range thereof. The pressure is applied to the lid by positioning weights on top of the lid, clamping the lid, engaging the first heating enclosure with a threaded lid, or any other suitable means of applying pressure. In one example, weights are placed directly on the lid positioned over the oil forming composition. The weights may be secured on the lid with any securing member, such as, but not limited to, cords, wires, cables, or ties. In another example, the first heating enclosure is positioned on top of the second heating enclosure, and clamps extending from the closed face of the first heating enclosure to the lid are tightened to provide the pressure. The positioning of the first heating enclosure on top of the second heating enclosure provides clearance for the clamps to be positioned on the closed face of the first heating enclosure while the second heating enclosure conveys heat from the heating surface to the first heating enclosure.

While applying pressure to the lid, the first heating enclosure and the heating unit are covered by at least two feet of soil, with or without riverbed stones mixed therein. The soil provides additional pressure to compress the oil forming composition within the first heating enclosure, and reduces or eliminates air flow to the first heating enclosure. Together, the soil and the lid, including the gasket material, form an air tight seal with the first heating enclosure. The air tight seal prevents air from entering the first heating enclosure to prevent combustion of the oil forming composition during crude oil production. In one embodiment, after covering the first heating enclosure and the heating unit with the soil, the oil forming composition within the first heating enclosure is heated to at least 1000° F. for about 5 hours. In another embodiment, the oil forming composition within the first heating enclosure is heated to between about 350° F. and about 475° F. for between about 20 and about 36 hours. Power is provided to the heating unit by any means, such as, but not limited to, an extension cord adapted to provide both 110 and 220 volts. As previously discussed, the air intake member provides air to the heating chamber while the heating unit is covered by the soil.

The oil forming composition is then cooled and the soil, including any riverbed stones, is removed to expose at least the first heating enclosure. In one embodiment, cooling the oil forming composition includes allowing the first heating enclosure to rest for between about 12 and 24 hours after turning off the heating unit, between about 14 and 24 hours after turning off the heating unit, at least 14 hours after turning off the heating unit, or any combination, sub-combination, range, or sub-range thereof. In another embodiment, an active cooling means is provided to cool the first heating enclosure after turning off the heating unit. The heating and cooling of the oil forming composition, while simultaneously applying pressure, forms a pre-volatile oil product within the first heating enclosure. Additional heating and cooling of the oil forming composition and/or the pre-volatile oil product provides increased formation and/or concentration of the pre-volatile oil product. Without wishing to be bound by theory, it is believed that the silica and/or quartz containing mineral aggregates provide a catalyst for the formation of the pre-volatile oil product by retaining heat during the heating of the oil forming composition.

After cooling the oil forming composition, the pressure is removed from the lid and at least the first heating enclosure is removed from the heating area. Additionally, the soil may be removed to expose the heating surface and/or the heating unit, which may also be removed from the heating area. The lid is then removed from the first heating enclosure to expose the pre-volatile oil product therein. Alternatively, the lid may be removed prior to and/or without removing the first heating enclosure from the heating area. The amount of pre-volatile oil product formed depends on the size of the first heating enclosure and the amount of the oil forming composition positioned therein. For example, a 1.21 gallon heating enclosure filled with the oil forming composition forms at least about 90 fluid ounces of pre-volatile oil product.

In one embodiment, the pre-volatile oil product is removed from within the first heating enclosure by pouring turpentine over the quartz containing mineral aggregates in the first heating enclosure, which mixes the turpentine with the pre-volatile oil product. Other solutions may be used to remove the pre-volatile oil product from within the first heating enclosure. After removing the pre-volatile oil product, the quartz containing mineral aggregates (e.g., shale, riverbed stones) may be re-used in the method of producing crude oil. In another embodiment, the quartz containing mineral aggregates are repeatedly re-used in the method of producing crude oil until the method yields a product having an organic odor and related characteristics. In an alternate embodiment, when sand is used in the oil forming composition, the pre-volatile oil product is passed through a straining apparatus to remove the sand therefrom. For example, the sand may be removed by passing the pre-volatile oil product through a strainer having $1/16''$ openings.

Following removal from the first heating enclosure, the pre-volatile oil product is exposed to air and heated to between about 200° F. and 225° F. to form a synthetic crude oil. In one embodiment, the pre-volatile oil product is heated for about 4 minutes to form a light crude oil. In another embodiment, the pre-volatile oil product is heated for about 8 minutes to form a heavy crude oil. In a further embodiment, the pre-volatile oil product is heated for about 12 minutes to form bitumen, from which asphalt is derived. As will be appreciated by one skilled in the art, the heating duration for forming light crude oil, heavy crude oil, and bitumen varies depending upon the temperature at which the pre-volatile oil product is heated.

According to the process disclosed herein, carbohydrates are thermo-chemically converted to hydrocarbons without the use of sulfur to form the light crude oil, the heavy crude oil, and/or the bitumen. In one embodiment, the light crude oil and the heavy crude oil both burn at about 750° F. In another embodiment, the light crude oil produces black smoke, and the heavy crude oil produces white-gray smoke.

The synthetic crude oil formed by the method 100 disclosed herein may then be distilled to form a volatile liquid and a residual oil. A method 200 of producing a volatile liquid includes providing a distilling unit (step 201), providing a portion of the synthetic crude oil in a heating flask (step 203), and heating the synthetic crude oil in the heating flask to form the volatile liquid (step 205). The heating of the synthetic crude oil vaporizes a portion of the synthetic crude oil in the heating flask, which condenses in a separate receiving flask to form the volatile liquid. The portion of the synthetic crude oil that is not vaporized remains in the heating flask, forming the residual oil. The volatile liquid is an amber colored fluid that is combustible through use of a standard lighter and has a dry oily feeling. The residual oil is a liquid similar to a heavy lubricating oil. In a further embodiment, heptane is added to the synthetic crude oil prior to distilling. For example, heptane is added at about 5% of the total volume, after forming the synthetic crude oil as discussed herein and prior to distilling the synthetic crude oil to form the volatile liquid. The addition of heptane enhances the volatility of the volatile liquid without substantially reducing an octane potential.

In one embodiment, heating the synthetic crude oil includes raising the temperature of the synthetic crude oil to between about 300° F. and about 450° F. for between 0.5 and 1 hours to form the volatile liquid. For example, the volatile liquid may be formed by raising the temperature of the synthetic crude oil to about 400° F. for at least about 0.5 hours. In another embodiment, the volatile liquid is further distilled to form a volatile fuel, similar to a gasoline and butane mixture, and a by-product, similar to kerosene. The volatile liquid is further distilled at temperatures of between about 150° F. and about 300° F., between about 150° F. and about 250° F., between about 175° F. and about 225° F., about 200° F., or any combination, sub-combination, range, or sub-range thereof. In an alternate embodiment, heating the synthetic crude oil includes raising the temperature of the synthetic crude oil to about 300° F. to form the volatile liquid, then raising the temperature to about 500° F. to form the by-product and the volatile fuel. The amount of volatile fuel formed from distilling the synthetic crude oil varies based upon the oil forming composition used. For example, the oil forming composition including the sand produces, by volume, at least about 95% volatile fuel and up to about 5% by-product, while the oil forming composition including the shale produces, by volume, about 50% volatile fuel and about 50% by-product.

EXAMPLES

Figure 3:
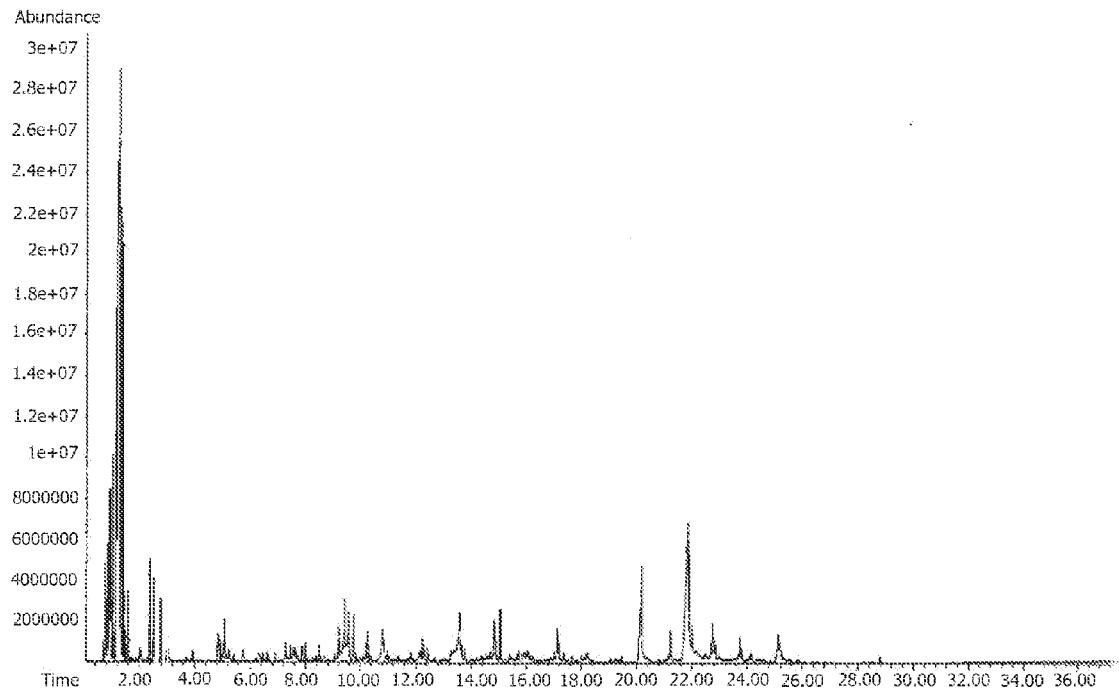
FIG. 3 is a full scale chromatogram of a volatile liquid fuel, according to an embodiment of the disclosure.
Figure 4:
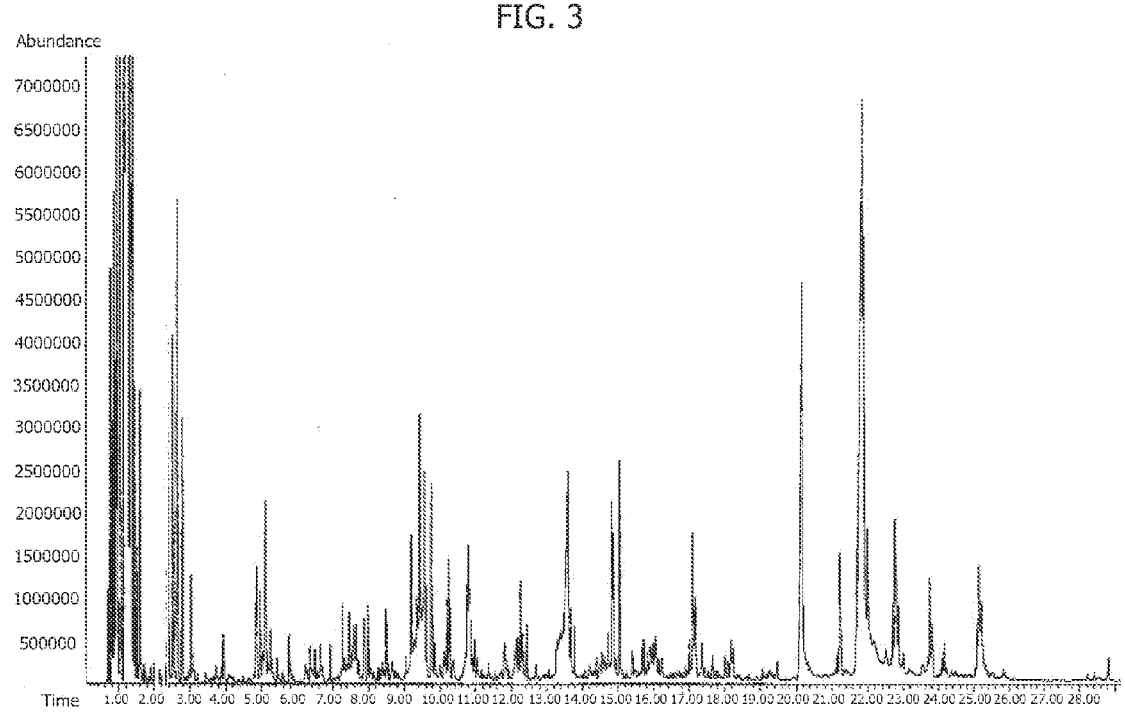
FIG. 4 is a base line zoomed chromatogram of a volatile liquid fuel, according to an embodiment of the disclosure.
Figure 5:
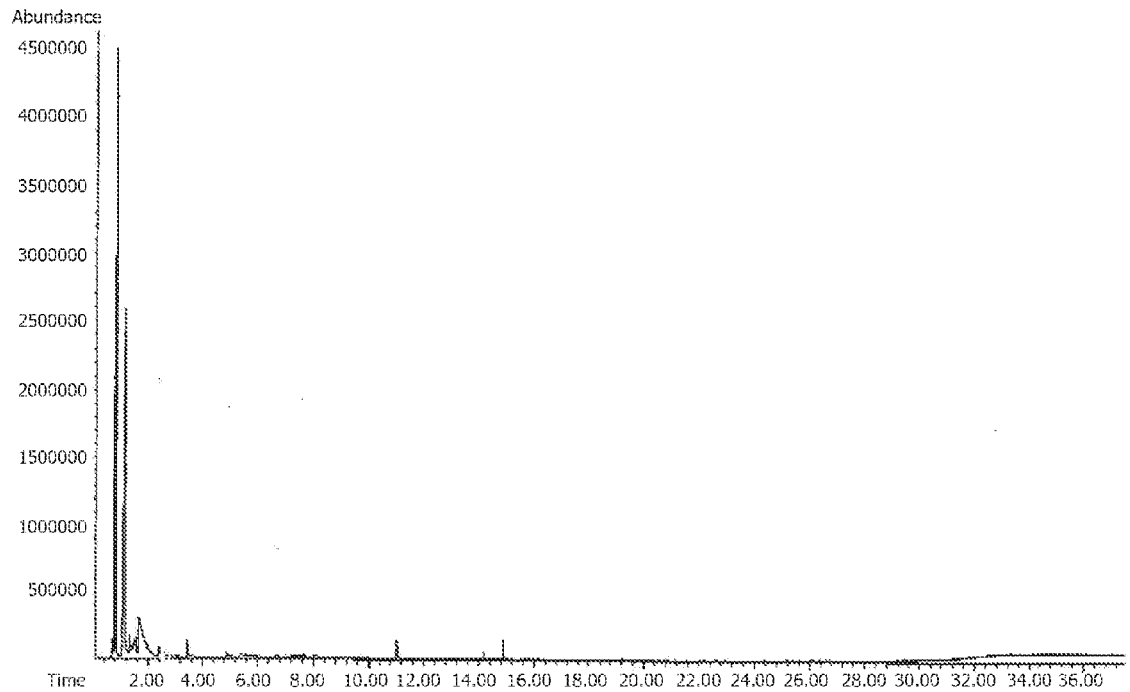
FIG. 5 is a full scale chromatogram of a residual oil, according to an embodiment of the disclosure.
Figure 6:
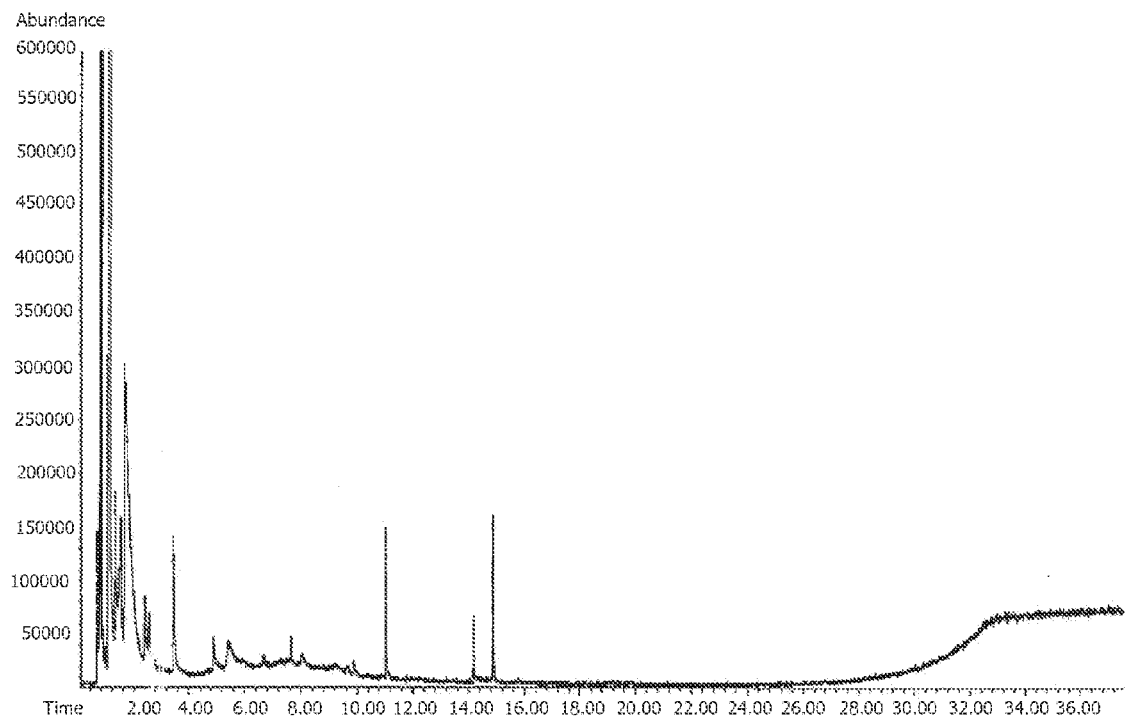
FIG. 6 is a base line zoomed chromatogram of a residual oil, according to an embodiment of the disclosure.

In one example, an oil forming composition includes a mixture of 50 fluid ounces of corn oil, 0.5 pounds of ground beef (20% fat), 1 head of chopped romaine lettuce, 12 unshelled walnuts, and about 130 cubic inches of shale. A pre-volatile oil product is formed by positioning the oil forming composition within a first heating enclosure, positioning a lid over the oil forming composition within the first heating enclosure, creating an air-tight seal around the oil forming composition, securing clamps on the lid to apply pressure to the oil forming composition, heating the first heating enclosure and the oil forming composition to 450° F. for 24 hours, and then allowing the unit to cool for 12 to 24 hours. The pre-volatile oil product is then removed from the first heating enclosure and distilled by heating the pre-volatile oil product to 400° F. for about 0.5 hours. Distilling the pre-volatile oil product produces a volatile fuel and a residual oil. Table 1 and FIGS. 3-4 show the chemical composition of the volatile fuel. Table 2 and FIGS. 5-6, show the chemical composition of the residual oil.

TABLE 1

| Retention Time (MIN) | Best Spectral Match | CAS |
|---|---|---|
| 0.773 | pentane | 109-66-0 |
| 1.410 | heptane | 142-82-5 |
| 2.031 | toluene | 108-88-3 |
| 2.523 | octane | 111-65-9 |
| 5.095 | nonane | 111-84-2 |
| 6.344 | benzene, propyl- | 103-65-1 |
| 8.489 | benzene, butyl- | 104-51-8 |
| 9.609 | heptanoic acid | 111-14-8 |
| 10.254 | benzene, pentyl- | 538-68-1 |
| 12.157 | nanoic acid | 112-05-0 |
| 10.972 | dodecane | 112-40-3 |
| 12.431 | tridecane | 629-50-5 |
| 13.278 | benzene, heptyl- | 1078-71-3 |
| 13.608 | n-decanoic acid | 334-48-5 |
| 13.786 | tetradecane | 629-59-4 |
| 14.560 | benzaldehyde, 4-pentyl- | 6853-57-2 |
| 15.051 | pentadecane | 629-62-9 |
| 17.019 | 11,14-eicosadienoic acid, methyl ester | 2463-02-7 |
| 17.365 | heptadecane | 629-78-7 |
| 20.139 | n-hexadecanoic acid | 57-10-3 |
| 21.844 | vaccenic acid | 506-17-2 |
| 22.707 | palmitoyl chloride | 112-67-4 |
| 23.806 | unknown sterol | N/A |

TABLE 2

| Retention Time (MIN) | Best Spectral Match | CAS |
|---|---|---|
| 0.722 | isopropyl alcohol | 67-63-0 |
| 0.741 | ethanol | 64-17-5 |
| 1.160 | acetic acid | 64-19-7 |
| 1.555 | propanoic acid | 79-09-4 |
| 1.818 | unknown | N/A |
| 2.402 | cyclopentanone | 120-92-3 |
| 2.555 | pentanoic acid | 109-52-4 |
| 3.418 | butane, 1-(1-methylpropoxy)- | 999-65-5 |
| 4.901 | cyclohexanone | 108-94-1 |
| 5.449 | n-propyl acetate | 109-60-4 |
| 11.020 | 9-oxabicyclo[6.1.0]nonane | 286-62-4 |
| 14.173 | hymexazole, trimethylsilyl ether | N/A |
| 14.882 | N-ethyl-4-piperidinecarboxamide | N/A |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of producing a synthetic crude oil, comprising:
   providing a heating unit;
   positioning a first heating enclosure adjacent to a heating surface of the heating unit;
   providing an oil forming composition within the first heating enclosure;
   positioning a lid over the oil forming composition within the first heating enclosure;
   simultaneously applying pressure to the lid and heating the oil forming composition within the first heating enclosure;
   cooling the oil forming composition to form a pre-volatile oil product; and
   heating the pre-volatile oil product while exposed to air to form the synthetic crude oil;
   wherein applying pressure to the lid compresses the oil forming composition within the first heating enclosure.

2. The method of claim 1, further comprising covering the heating unit and the first heating enclosure with top soil.

3. The method of claim 2, wherein the heating unit comprises a hot plate including a heating surface in thermal communication with a heating chamber.

4. The method of claim 3, further comprising securing an air intake member to the heating chamber.

5. The method of claim 1, wherein applying pressure to the lid comprises a process selected from the group consisting of positioning weights on top of the lid, clamping the lid, and engaging the first heating enclosure with a threaded lid.

6. The method of claim 1, wherein heating the oil forming composition includes increasing the temperature of the oil forming composition to at least 1000° F.

7. The method of claim 1, further comprising pouring turpentine over mineral aggregates in the first heating enclosure to remove the pre-volatile oil product therefrom.

8. The method of claim 1, wherein heating the pre-volatile oil product comprises exposing the pre-volatile oil product to a temperature of between 200° F. and 225° F.

9. The method of claim 8, further comprising heating the pre-volatile oil product for about 4 minutes to form a light crude oil.

10. The method of claim 8, further comprising heating the pre-volatile oil product for about 8 minutes to form a heavy crude oil.

11. The method of claim 8, further comprising heating the pre-volatile oil product for about 12 minutes to form bitumen.

* * * * *